United States Patent [19]

Morgan et al.

[11] 3,737,147
[45] June 5, 1973

[54] VEHICLE JACK

[75] Inventors: George H. Morgan, South Bend, Ind.; R. Harlan Nehrig, Stevensville, Mich.

[73] Assignee: Auto Specialties Manufacturing Company, St. Joseph, Mich.

[22] Filed: Feb. 4, 1971

[21] Appl. No.: 112,555

[52] U.S. Cl. .................................................. 254/108
[51] Int. Cl. .................................................. B66f 1/04
[58] Field of Search ....................... 254/106–111; 74/141.5, 156, 157, 160, 162, 575, 169

[56] References Cited

UNITED STATES PATENTS

| 1,240,278 | 9/1917 | Willour | 254/111 |
| 1,394,263 | 10/1921 | Adell | 254/111 |
| 2,361,690 | 10/1944 | Hunz | 254/110 |
| 3,108,784 | 10/1963 | Ulm | 254/110 |
| 3,180,618 | 4/1965 | Ulm | 254/109 |
| 3,517,911 | 6/1970 | Grams | 254/111 |

Primary Examiner—Othell M. Simpson
Attorney—Olson, Trexler, Wolters & Bushnell

[57] ABSTRACT

A A vehicle jack has a housing slidable on a tubular column. A plastic guide in the housing a retained therein by tabs that project through the housing sides forms a bearing that slides on the column. The housing has a pawl mechanism, the operation of which is determined by the operative condition of the pawl spring so that the housing may be selectively raised or lowered on the column. A direction-setting lever, which determines the operative condition of the pawl spring, is pivoted to the housing and has a concave seat that substantially prevents lateral movement of the spring during the operation of the pawl mechanism and also is of such size as to cause the lever to roll under the spring action and thereby prevent localized stress on the spring.

12 Claims, 8 Drawing Figures

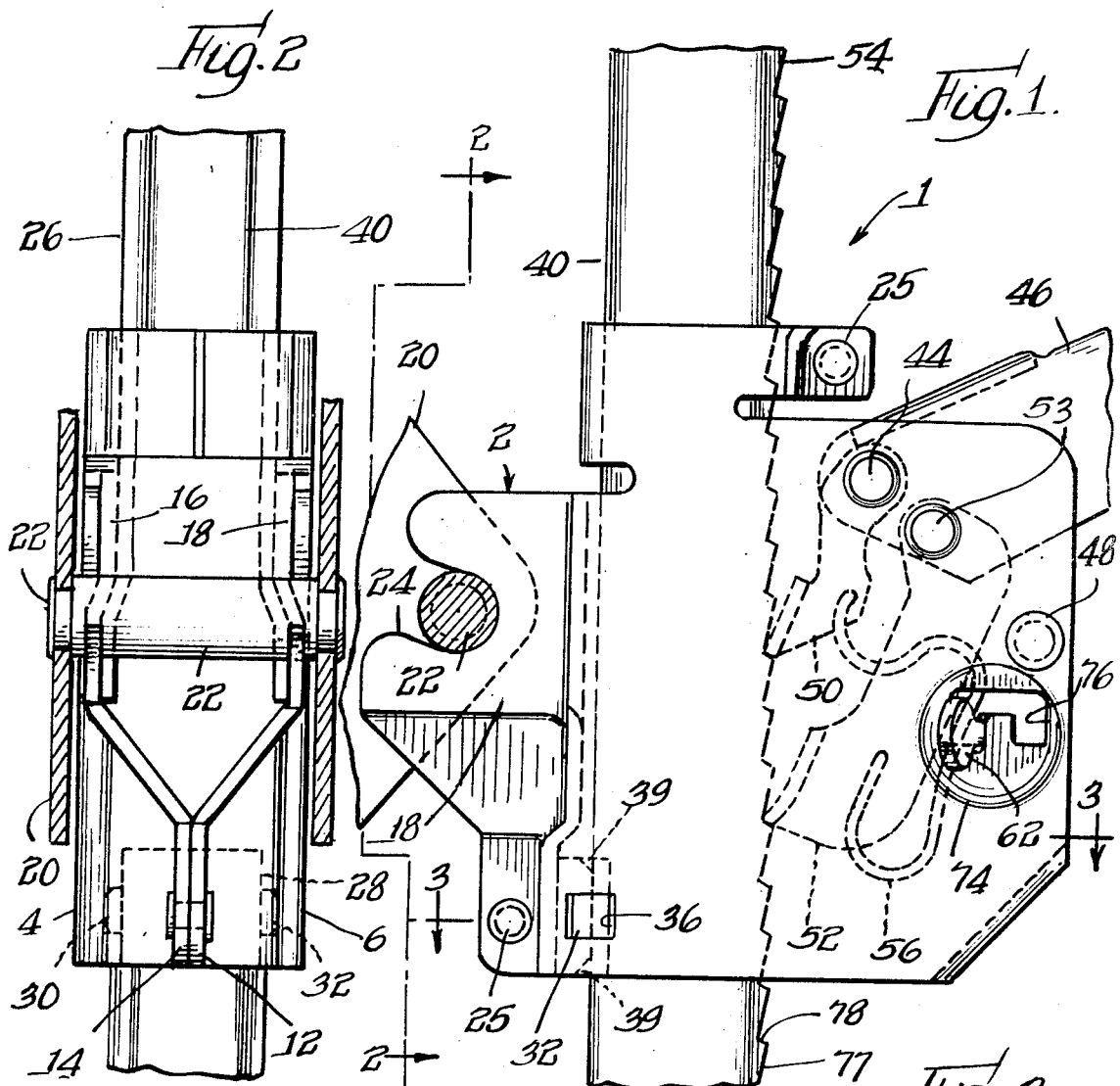

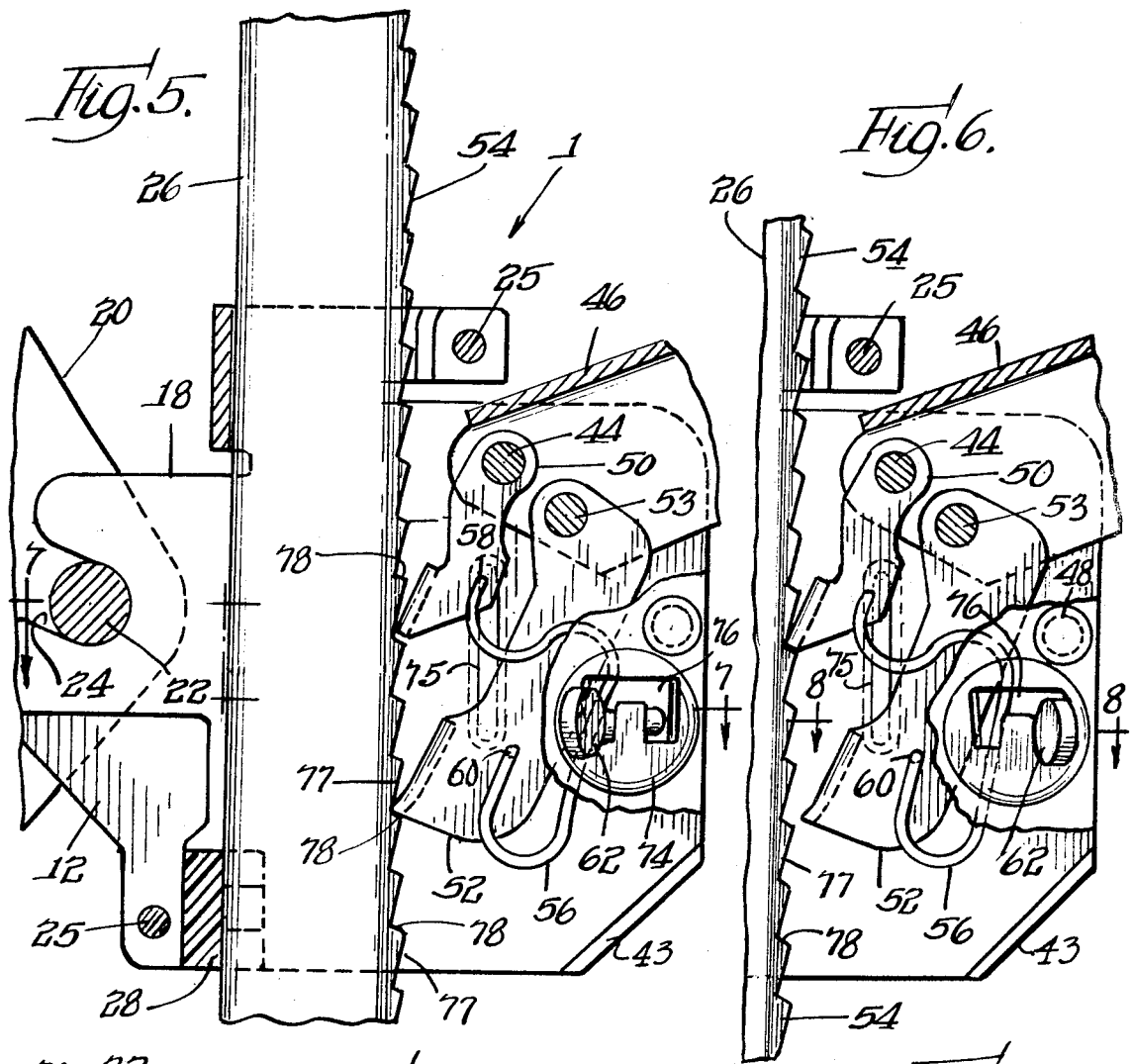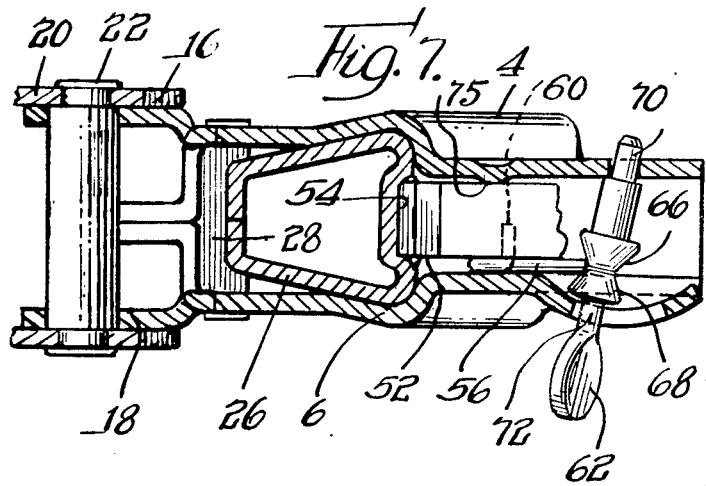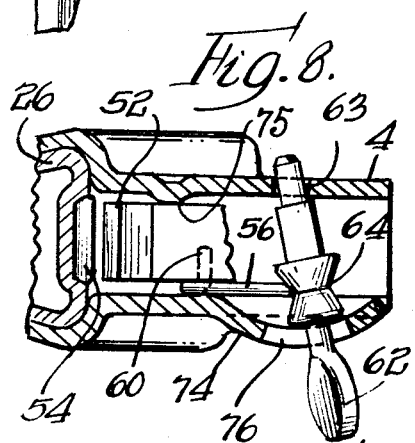

3,737,147

VEHICLE JACK

BACKGROUND OF THE INVENTION

This invention relates to improvements in jacks primarily for automotive vehicles. The type of jack with which the present invention is concerned includes a body or housing that is mounted for vertical movement on a column and wherein the housing has a pawl mechanism which can be set for raising and lowering the housing when the latter is supporting a load. The operative relationship of the pawl mechanism and the column is determined by a pawl spring which can be set in either of two positions by a direction-setting lever. The pawl spring itself is frequently a curved piece of wire that is generally planar except for portions that engage the pawl mechanism. When the pawl mechanism operates during raising or lowering of the housing, the pawl spring undergoes a flexing. In the prior art, pawl springs of the foregoing type tended to wobble or move laterally rather than flex generally in the plane thereof. This sometimes causes the pawl mechanism to be erratic in operation. Furthermore, as the spring undergoes flexing there is a rubbing action against the direction-setting lever that tends to cause a concentration of stress at a highly localized area of the spring, sometimes resulting in premature failure.

Another problem encountered in jacks of the foregoing type lies in the bearing arrangement between the housing and the column. Where both the housing and column are of stamped sheet metal pieces, it is sometimes difficult to produce low friction bearing surfaces with the result that when the jack is under load, it becomes unnecessarily difficult to operate.

The present invention is an improvement on the subject matter disclosed in the U.S. Pat. to Grams, No. 3,517,911, issued June 30, 1970.

SUMMARY OF THE INVENTION

An object of the present invention is to provide an improved jack in which the pawl spring is restrained by the direction-setting lever in such a manner as to prevent substantial lateral displacement or wobble of the spring as the pawl mechanism operates during raising or lowering of the housing on the jack column, thereby to improve the overall reliability of the jack-operating mechanism.

A further object of this invention is to provide a jack of the type stated which reduces the extent of localized loading or stressing of the pawl spring so as to reduce the possibility of spring wear, fatigue stresses and other possible causes of premature failure.

An additional object of this invention is to provide a housing having a narrow vertical rib or indent that cooperates with the pawl spring to guide the pawls during movements thereof.

Another object of this invention is to provide a novel plastic glide member that is uniquely mounted within the housing at the lower side thereof so as to form an anti-friction bearing surface between the housing and the column when the housing is being raised or lowered while under load.

In accordance with the foregoing objects, the invention comprises a housing with an anti-friction plastic glide therein adapted for sliding engagement with the column upon which the housing is mounted. The glide has opposed retaining tabs that project through opposed sidewalls of the housing, and the glide is backed by an end wall of the housing. A pin-like direction-setting lever is pivoted in the housing and movable to a first position in which a pawl spring is positioned to bias a pawl mechanism into a relation with the column for moving the housing in one direction along the column. The lever is also movable to a second position in which the pawl spring is positioned to cause the pawl mechanism to move into a second relation with the column for movement of the housing in the opposite direction along the column. The lever has a concave seat for the pawl spring of such size that the seat restricts the lateral movement of the pawl spring upon movement of the pawl mechanism. The spring seat may be formed by opposed approximately conical surfaces that converge toward each other. Furthermore, the lever has portions thereof on opposite sides of the spring seat that are engageable with opposed walls of the housing. The spring seat is of a larger diameter than the portions of the lever that engage the housing whereby the lever tends to roll under the action of the spring and thereby reduce wear on the spring.

The attainment of the above and further objects of the invention will be apparent from the following detailed description taken in conjunction with the accompanying drawing forming a part thereof.

BRIEF DESCRIPTION OF THE FIGURES

In the drawing:

FIG. 1 is a fragmentary front elevational view of a jack assembly constructed in accordance with and embodying the present invention;

FIGS. 2 and 3 are fragmentary sectional views taken along lines 2—2 and 3—3 respectively of FIG. 1;

FIG. 4 is an enlarged perspective view of the anti-friction glide that forms part of the present invention;

FIG. 5 is a fragmentary vertical sectional view of the jack showing the direction-setting mechanism in position for elevating the jack housing;

FIG. 6 is a fragmentary sectional view of a portion of the structure of FIG. 5 and showing the direction-setting mechanism positioned for lowering the housing;

FIG. 7 is a fragmentary sectional view taken approximately along line 7—7 of FIG. 5; and FIG. 8 is a fragmentary sectional view taken along line 8—8 of FIG. 6.

DETAILED DESCRIPTION OF THE FIGURES

Referring now in more detail to the drawing there is shown an automobile jack assembly 1 comprising a sheet metal body or housing 2 having cooperating housing halves 3, 5 which, when joined, form a housing with spaced apart sidewalls 4, 6. The forward margins of the sidewalls 4, 6 are turned toward each other to provide cooperating wall portions 8, 10 that meet at a recess-forming seam 11. The wall portions 8, 10 constitute an end wall for the lower part of the housing 2. The wall portions 8, 10 terminate in forwardly extending flanges 12, 14 which are flush at the lower part of the housing, as shown in FIG. 3. The upper ends of the flanges 12, 14 diverge, as shown in FIG. 2, to provide opposed spaced apart trunion plates 16, 18. A gripping member 20 of known type is provided for attachment to a vehicle bumper. The gripping member 20 is pivotally mounted on the trunion plates 16, 18 by a relatively large load-supporting cross pin 22 that is received in aligned slots 24 in the trunion plates 16, 18.

The housing halves 3, 5 may be secured together by any suitable means, including rivets 25.

Disposed within the housing 2 is an upstanding sheet metal tubular support or column 26 having a generally trapezoidal cross section as shown in FIG. 3. The housing 2 is slidably mounted on the column 26. An antifriction glide 28 is mounted in the housing 2 to provide a bearing surface that slides on the column 26. This glide 28 may be of high density polyethylene or other plastic material having relatively low frictional qualities. The glide 28 is disposed at the lower end of the housing 2 and is provided with opposed tabs 30, 32 that project through substantially companion shaped openings 34, 36 in the housing walls 4, 6. The glide 28 has a concave surface 38 that slidably receives a companion shaped surface portion 40 of the column 26. From its upper and lower surfaces the glide 28 has chamfers 39, 39 running to the surface 38. In the form of the invention herein shown, the surface portion 40 includes a vertical end surface of the column and a small portion of each of the vertical side surfaces of the column. Opposite to the surface 38 the glide 28 has a vertical rib 42 that fits into the recess formed by the seam 11. The glide 28 may be assembled with the two housing halves prior to permanently securing the housing halves together.

When a vertical load is applied to the gripping member 20 and hence to the pin 22, the housing 2 tends to twist counterclockwise, as viewed in FIG. 1. Such action results since the pin 22 is horizontally offset from the glide 28. Consequently, the glide 28 tends to be pressed toward the column 26 urging the companion surface portions 38, 40 into engagement. These companion surfaces provide a relatively low sliding friction between the housing and the column as the housing is moved up and down the column. The housing sidewalls 4, 6 are inwardly turned at a bottom corner of the housing to form abutting tabs 41, 43 that assist in spacing of the sidewalls 4, 6 and in preventing the sidewalls from buckling under load.

Secured to and extending transversely of the sidewalls 4, 6 is a rod 44 that pivotally supports a socket 46 for receiving a jack handle (not shown). Also mounted on and extending transversely of the sidewalls 4, 6 is a handle socket stop pin 48 which limits the downward movement of the handle socket 46. A holding pawl 50 is pivotally mounted on the rod 44 and a lifting pawl 52 is pivotally mounted on a pin 53 that is carried by the handle socket 46. The pawls 50, 52 are adapted to engage, in a predetermined manner, a set of rack teeth 54 on the surface of the column 26 that is presented toward the pawls 50, 52.

A wire pawl spring 56 is employed for biasing the pawls 50, 52 in a manner to raise and lower the housing 2. The body of the pawl spring 56 is substantially in a vertical plane except for offsets 58, 60 which project through the respective pawls 50, 52 and by which the pawl spring 56 is attached to the pawls 50, 52. A pin constituting a direction-setting lever 62 extends between the walls 4, 6, being loosely pivotally mounted in an opening 63 in the wall 4. Intermediate to walls 4, 6 the lever 62 has a concave pawl spring seat 64 that is formed by opposed generally conical surfaces 66, 68. The diameter of the spring seat 64 is greater than the portion 70, 72 of the lever 62 that engage the respective walls 4, 6. The portion of the wall 6 in the region of the lever 62 is stamped with an outwardly extending dimple 74 having an inverted U-shaped slot 76. The slot 76 has opposed legs whereby the lever 62 may be retained in the position shown in FIGS. 5 and 7 or, alternatively, in the position shown in FIGS. 6 and 8.

Portions of the sidewalls 4, 6 generally upwardly and rearwardly of the glide are indented and the sidewall 4 is impressed with an inwardly projecting vertical rib 75. This rib 75 cooperates with the pawl spring 56 to guide the pawls 50, 52 into the teeth 54 in a manner that is more effective than prior arrangements.

When the lever 62 is in the left hand leg of the slot 76, as shown in FIGS. 5 and 7, the pawl mechanism is urged into a relation with the column 26 for moving the housing 2 in a step-by-step fashion upwardly therealong. The pawl spring 56 is compressed as shown in FIGS. 5 and 7 so as to bias the pawls 50, 52 into engagement with the teeth 54. The slope on the underside 77 of each tooth is at a smaller angle to the vertical than is the slope of the upperside 78 of each tooth. Therefore, when the jack handle and the socket 46 are swung downwardly the lifting pawl 52 will be raised along with the housing until the tip of the lifting pawl 52 is on the top surface 78 of the tooth. The holding pawl 50, which is also biased toward the teeth 54, is also raised along with the housing to the top 78 of the next higher tooth so that when the jack and handle socket 46 are swung upwardly, the engagement of the tip of the pawl 50 with the upper surface 78 of a tooth serves to retain the housing and thereby support the load. This sequence of movement of the parts is repeated until the housing is at the desired elevation. When it is desired to lower the housing 2 the lever 62 is lifted and then pivoted and pushed downwardly into the right hand leg of the slot 76 to relieve the bias of the pawl spring 56 against the pawl 52, as shown in FIGS. 6 and 8. With the jack handle and handle socket 46 in the upper position, as shown in the drawing, the lifting pawl 52 will be clear of the teeth 54. As the jack handle and its socket 46 is rocked downwardly the tip of the lifting pawl 52 is caused to engage the top 78 of the next lower tooth. Upon firm contact of the lifting pawl 52 with the aforesaid top of the next lower tooth, the load on the housing is transmitted to the lifting pawl 52. The position of the lifting pawl 52 at this time is at its lowest in the cycle and results in a pull on the pawl spring 56 to pull the holding pawl 50 away from the tooth that the pawl 50 is engaging. When the jack handle and socket 46 are again lifted upwardly the bias of the pawl spring 56 is restored (shown in FIG. 6) so that the holding pawl 50 engages the next lower tooth when the jack handle and socket 46 reach their upper positions. At this time the load is supported by the holding pawl 50. The foregoing sequence is repeated until the housing 2 is lowered to the desired position.

As the pawl 52 undergoes rocking movement during lifting and lowering of the housing, as aforesaid, a flexing is imparted to the pawl spring 56. The concave seat 64 tends to keep the pawl spring properly aligned, namely in a vertical position, and thereby aid in maintaining proper operation of the pawl mechanism. Furthermore, since the seat 64 is of a larger diameter than the lever portions 70, 72 which engage the housing walls 4, 6, the flexing of the spring 56 tends to apply a torque to the lever 62 and impart a rolling motion to the lever. The torque on the lever 62 is determined by the product of the radius of the seat 64 and the spring force perpendicular thereto. This torque is resisted by the friction of the walls 4, 6 at the lever portions 70, 72. If the seat 64 is of relatively large diameter only a small spring force is needed to impart a rolling action to the lever. It will be appreciated that a rolling of the lever prevents or reduces a localized rubbing of the pawl spring at the pawl seat and thereby reduces the possibility of premature failure of the pawl spring.

The invention is claimed as follows:

1. In a jack assembly, a support, a housing mounted for movement along said support and including pawl means therein, and a pawl spring having its end portions attached to said pawl means for urging said pawl means into a first relation with said support for moving said housing in one direction along said support and into a second relation with said support for moving said housing in the opposite direction along said support, said pawl means flexing said pawl spring upon movement of said housing along said support, a pin-like direction-setting lever in said housing and extending generally transversely thereof and projecting laterally outwardly therefrom, said lever being movable to a first position in which said pawl spring is positioned to bias said pawl means into said first relation with said support, said lever being movable to a second position in which said pawl spring is positioned to cause said pawl means to move into said second relation with said support, said lever having a concave seat in engagement with said pawl spring intermediate the end portions thereof, the seat being of such lateral size relative to the width of the pawl spring at said seat that said seat restricts the lateral movement of said pawl spring upon movement of said pawl means.

2. An assembly according to claim 1 in which said seat is formed by opposed approximately conical surfaces that converge toward each other.

3. An assembly according to claim 1 in which said housing has opposed walls for engagement with portions of the lever that are on opposite sides of said seat, said seat being annular and of a diameter greater than said portions.

4. A direction-setting mechanism for use in a jack assembly having a housing movable on a support, and means in said housing for effecting movement of the housing along the support in opposite directions; said means including pawl means and a wire spring member having a generally planar body with its end portions offset from the plane of the body and engageable with said pawl means; said direction-setting mechanism comprising a pin mounted on and extending transversely within the housing and projecting laterally outwardly thereof, said pin having a seat for engagement by said spring body intermediate said end portions and having selectable positions on said housing in which the spring permits movement of the housing in selected direction and wherein the spring is flexed during movement of the housing, said seat being of a concave shape that substantially prevents movement of said spring body laterally of its plane upon flexing of said spring.

5. A mechanism according to claim 4 in which the pin has regions on opposite sides of the seat for engagement with the housing, said seat and regions being of annular shape, the seat being of a diameter that is greater than the diameter of the pin at said regions.

6. In a jack assembly, a housing having spaced apart sidewalls and portions that extend from the sidewalls to constitute an endwall running transversely of the sidewalls, an anti-friction glide in said housing and extending between said sidewalls and being backed by said endwall, said glide having tabs projecting into openings in said sidewalls, a support in said housing and having a surface portion spaced from said endwall and with a contour companion to the contour of a surface portion of said glide, said housing being mounted on said support and having mechanism therein for cooperation with said support to move the housing selectively in opposite directions therealong with said housing supporting a load offset from said glide such that the force from the load urges the glide against said support during movement of said housing.

7. A jack assembly according to claim 6 in which said glide is a one piece plastic material and the surface portion thereof is concave.

8. A jack assembly according to claim 6 in which the region of juncture of the portions constituting the endwall provides a recess, and said glide has a rib in said recess.

9. A jack assembly according to claim 6 in which said housing has opposed tabs at its lower end to resist inward buckling of the sidewalls under said load.

10. In a jack assembly, a housing having mechanism therein for cooperation with a support to move the support selectively in opposite directions therealong, said housing also having a wall structure including spaced apart sidewalls and an endwall running transversely between the sidewalls, and an anti-friction glide in said housing and extending between the sidewalls and being backed by said endwall, said glide having tabs projecting through said wall structure and a generally concave surface portion for slidable engagement with a support, said concave surface being of a plastic material.

11. In a jack assembly, a support, a housing mounted for movement along said support, said housing having spaced apart wall portions, an anti-friction glide in said housing and having a plastic bearing surface in sliding engagement with said support, said glide having tabs projecting through said spaced apart wall portions, pawl means in said housing, a pawl spring attached to said pawl means for urging said pawl means into a first relation with said support for moving said housing in one direction along said support and into a second relation with said support member for moving said housing in the opposite direction along said support, said pawl means flexing said pawl spring upon movement of said housing along said support, and a pin-like direction-setting lever in said housing and extending generally transversely thereof and projecting laterally outwardly therefrom, said lever being movable to a first position in which said pawl spring is positioned to bias said pawl means into said first relation with said support, said lever being movable to a second position in which said pawl spring is positioned to cause said pawl means to move into said second relation with said support member, said lever having a concave seat for said pawl spring of such size that it restricts the lateral movement of said pawl spring upon movement of said pawl means.

12. A jack assembly according to claim 9 in which said glide is a one piece plastic member, and said concave seat is formed by opposed converging surfaces.

* * * * *